(12) United States Patent
Nazzal

(10) Patent No.: US 6,183,594 B1
(45) Date of Patent: Feb. 6, 2001

(54) METHOD AND SYSTEM FOR DETECTING THE END-POINT IN ETCHING PROCESSES

(75) Inventor: Adel Issa Nazzal, San Jose, CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/161,010

(22) Filed: Sep. 25, 1998

(51) Int. Cl.⁷ ................... G01B 7/00; G11B 5/00
(52) U.S. Cl. .............................. 156/345; 216/61
(58) Field of Search ................. 216/61, 86; 438/10, 438/13, 17, 18; 156/345

(56) References Cited

U.S. PATENT DOCUMENTS

| | | | |
|---|---|---|---|
| 4,511,942 | 4/1985 | Valstyn | 360/126 |
| 4,675,986 | 6/1987 | Yen | 29/603 |
| 4,861,398 | 8/1989 | Fukuoka et al. | 156/64 |
| 5,065,483 | 11/1991 | Zammit | 29/603 |
| 5,210,667 | 5/1993 | Zammit | 360/113 |
| 5,321,304 | * 6/1994 | Rostoker | 257/621 |
| 5,361,547 | 11/1994 | Church et al. | 451/5 |
| 5,463,805 | 11/1995 | Mowry et al. | 29/603 |
| 5,494,473 | 2/1996 | Dupuis et al. | 451/1 |
| 5,559,429 | 9/1996 | Mowry et al. | 324/1.5 |
| 5,597,340 | 1/1997 | Church et al. | 451/5 |

* cited by examiner

*Primary Examiner*—Thi Dang
(74) *Attorney, Agent, or Firm*—Robet B. Martin; Felsman, Bradley, Vaden, Gunter & Dillon, LLP

(57) ABSTRACT

A method and system are disclosed for detecting the end-point of an etching cycle utilizing an etching device, sensor strips, and one or more resistance measuring devices. First, one or more sensor strips are deposited onto a substrate material. Resistance measuring devices are electrically connected to the sensor strips. Thereafter, the sensor strips residing on the substrate material are etched alongside product material. As each sensor strip is etched, its resistance will increase in a predictable manner with respect to the amount of material eroded from its surface. The resistances of the sensor strips are measured in real time over the duration of the etching cycle. Finally, the resistances measured by the resistance measuring devices are used to track etch depth in real time, enabling the etch device operator to determine the precise point in time at which the end-point has been reached and the cycle should be terminated.

5 Claims, 3 Drawing Sheets

METHOD AND SYSTEM FOR DETECTING THE END-POINT IN ETCHING PROCESSES

BACKGROUND OF THE INVENTION

1. Technical Field

The present invention relates to a method and system for monitoring etching processes utilized in the field of electronic circuitry. In particular, the present invention relates to a method and system for measuring etch depth. More particularly, the present invention relates to measuring etch depth in real time during etching cycles. Still more particularly, the present invention relates to a method and system for tracking etch depth in real time to accurately determine the end-point of an etching cycle.

2. Description of the Related Art

Etching technology in general is a rapidly developing field. Etching techniques are widely used in the field microelectronics to erode selected portions of a surface in order to produce a desired pattern on substrate surfaces. The need for greater precision in the profile and depth of etch channels has created a need for a method of accurately measuring etch depth during a cycle in order to prevent over-or under-etching product materials. Etching techniques are commonly categorized as either being "wet" or "dry" etching methods. Wet etching utilizes liquid etchants which provide high selectivity to both substrate and masking layers. Wet etching processes are typically isotropic, meaning that they provide poor control of etch profile.

Dry etching utilizes the physical mechanism of sputtering to remove substrate material. The directional nature of dry etching results in anisotropic etching in which essentially vertical etch profiles are produced. Reactive ion etching is a dry etch process which combines chemical and physical mechanisms and hence offers both adequate selectivity and greater edge profile precision.

Since etching techniques are time-dependent processes, it is possible to determine the end-point solely as a function of time. However, the etching process is also a function of several variables which are not temporally uniform. These variables include etch chamber exposure to room ambient, chemical distribution within the system, gas flow rates, operator experience etc. The result is a lack of accuracy and uniformity among the etches in a single cycle and also a lack of reproducibility between cycles.

Due to extremely low error tolerances which characterize VLSI production, the dry etch techniques employed therein generally require highly precise and specialized end-point detection techniques. The most common of the techniques used to detect the end-point during etching processes utilized in VLSI production include: 1) optical emission spectroscopy; 2) laser interferometry; 3) direct visual observation of the etched surface through a viewing port; and 4) mass spectroscopy. A problem associated with these techniques is twofold: first, highly sophisticated peripheral equipment must be added to the etching tool apparatus; and second, these techniques utilize an extremely small scale of measurement to provide the necessary level of precision required for VLSI patterns. As a result, these techniques are simply not practicable in etching applications that measure etch depth on a much larger scale. One such application in which the abovementioned methods are ineffective and time etches are used instead, is the etching process used in the fabrication of magnetic reading and/or recording element and disk sliders.

The magnetic reading and/or recording element is generally encapsulated in a disk slider, which provides physical support for both the magnetic reading and/or recording element and the electrical connections between the magnetic reading and/or recording element and the remainder of the disk drive system. The disk slider also provides an air-bearing surface which permits the magnetic reading and/or recording element to "fly" in close proximity to the surface of the spinning disk. Several parameters which are controlled by the design of the disk slider affect the amount of information which may be stored on the disk. One is the distance between the magnetic reading and/or recording element imbedded in the disk slider and the surface of the disk. As this distance is reduced, the spatial density of binary information encoded on the disk may be increased. Another parameter which is critical to disk slider performance is the depth of the contours which are etched onto the disk sliders after they have been lapped.

Disk sliders, typically formed from a ceramic wafer, generally have bottom surfaces that form air-bearing surfaces capable of flying over the spinning disk. The magnetic reading and/or recording element is mounted within the disk slider, and extends down through a rail, terminating at the air-bearing surface of the rail. Both lapping and etching processes attempt to create a smooth air-bearing surface by removing material from the magnetic reading and/or recording element and rail surfaces. To form sliders with air-bearing surfaces that are precisely positioned relative to the structure of the magnetic reading and/or recording element, the lapping and etching processes must be closely controlled.

Currently, several techniques are utilized to monitor and control lapping processes. Among such techniques is the use of electrical lapping guides. This technique involves measuring the resistance of a sensor strip located on the substrate containing the magnetic transducer elements being lapped. The sensor strip is lapped along one dimension to the same extent as the magnetic transducer elements. The resistance of the sensor strip at any given time indicates the amount of material that has been removed from the element and hence the resistance is an indication of the final height of the transducer element being lapped.

As previously discussed, current disk slider etching processes often utilize time as a primary end-point detection parameter. Control of these etching processes has therefore not kept pace with the need for increased etch depth precision. As a result, a problem associated with etching techniques, particularly those used for larger scale applications, is that of detecting the end-point of an etching cycle accurately and uniformly. It is important that the end-point of an etching cycle be accurately determined to reduce over- and underetching thereby increasing yield and run-to-run reproducibility.

Based on the foregoing, it can be appreciated that a need exists for an improved method and system that would allow the operator of an etching device to accurately measure etch depth in real time. Such a method and system, if implemented, would be useful by enabling the etch tool operator to accurately terminate the etching process at the precise point in time at which the target etch depth has been attained.

SUMMARY OF THE INVENTION

It is therefore an object of the invention to provide a method and system for monitoring etching processes.

It is another object of the invention to provide a method and system for measuring etch depth.

It is still another object of the invention to provide a method and system for measuring etch depth in real time during etching cycles.

It is yet another object of the invention to provide a method and system for tracking etch depth in real time to accurately determine the end-point of an etching cycle.

The above and other objects are achieved as is now described. A method and system are disclosed for detecting the end-point of an etching cycle utilizing an etching device, sensor strips, and one or more resistance measuring devices. First, one or more sensor strips are deposited onto a substrate material. Resistance measuring devices are electrically coupled to the sensor strips. Thereafter, the sensor strips residing on the substrate material are etched alongside product material. As each sensor strip is etched, its resistance will increase in a predictable manner with respect to the amount of material eroded from its surface. The resistances of the sensor strips are measured in real time over the duration of the etching cycle. Finally, the resistances measured by the resistance measuring devices are used to track etch depth in real time, enabling the etch device operator to determine the precise point in time at which the end-point has been reached and the cycle should be terminated.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

The present invention is preferably for use in dry etching and particularly reactive ion etching techniques and ion milling techniques utilized in the fabrication of magnetic reading and/or recording element assemblies. The methods and systems of the present invention can, however, be applied to other etching applications in which current end-point detection methods are impossible or impracticable.

Figure 1A:
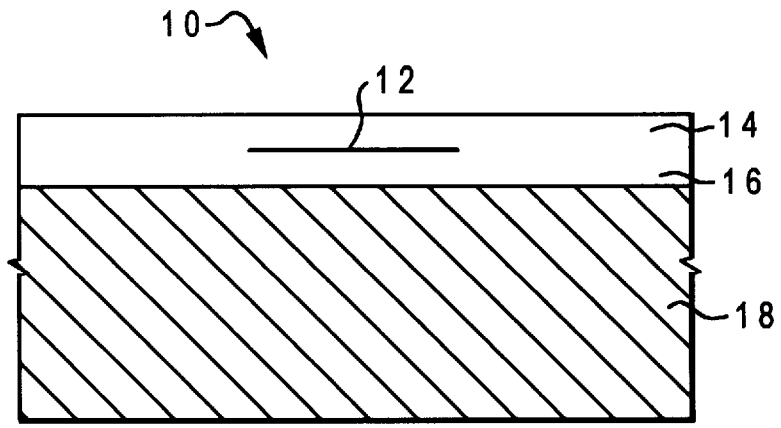
FIG. 1A illustrates an edge view of an end-point detection sensor in accordance with a preferred embodiment of the present invention.

With reference now to the figures and in particular with reference to FIG. 1A, there is depicted a representative edge view of a sensor 10. Sensor 10 includes a sensor strip 12 residing on a substrate 18. In one embodiment of the present invention as depicted in FIG. 1A, sensor strip 12 is immersed in an alumina coating comprised of undercoat 16 and overcoat 14.

Figure 1B:
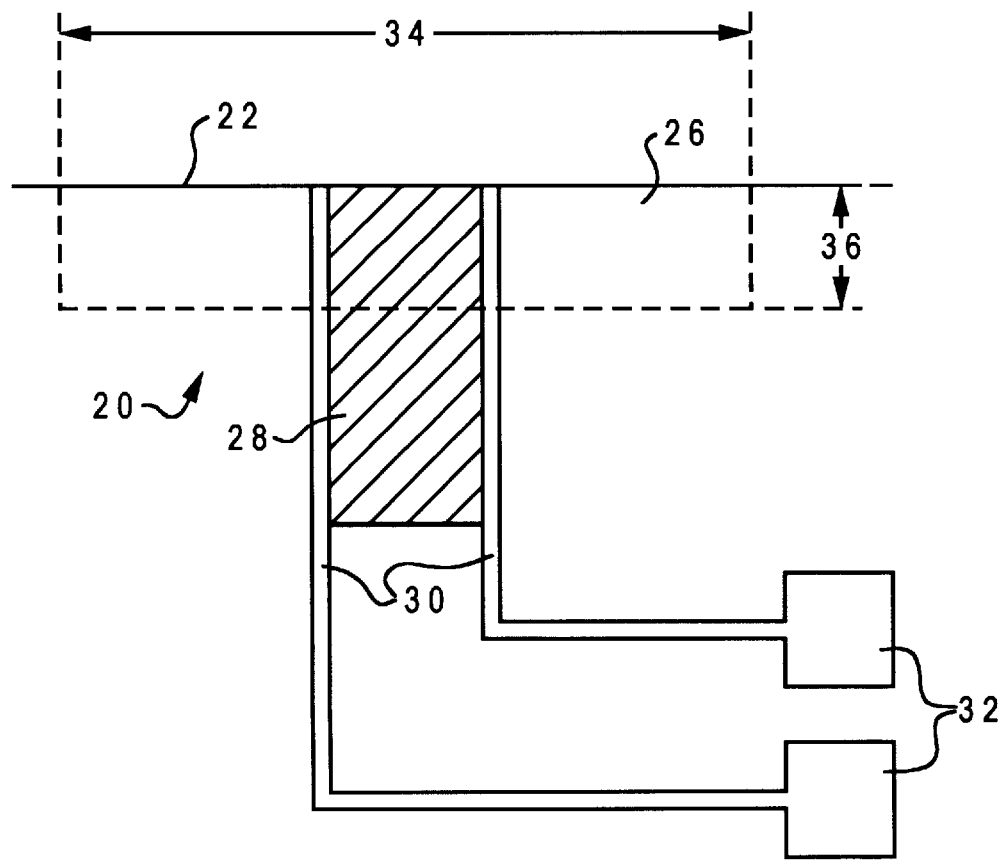
FIG. 1B depicts a top view of an end-point detection sensor in accordance with a preferred embodiment of the present invention.

FIG. 1B depicts a top view of a sensor 20, which may be utilized in accordance with a preferred embodiment of the present invention. Sensor 20 includes a wafer substrate 26, a sensor strip 28, contact pads 32, and conductors 30. Sensor 20 can be implemented utilizing any suitable substrate material such as silicon or ceramic. Although the embodiment depicted in FIG. 1B utilizes a wafer substrate, other favorable embodiments of the present invention can be implemented in other types of structures that are capable of being etched in an etching device. Sensor strip 28 resides on wafer substrate 26 by means of an alumina coating similar to that depicted in FIG. 1A. Sensor strip 28 is preferably constructed of a material of known resistance. In one embodiment of the present invention, sensor strip 28 is a metallic alloy with known resistance characteristics.

During the etching process, sensor strip 28 is eroded at a rate predictable with the rate of erosion of product material. The resistance across sensor strip 28 increases as a function of the level of erosion. Sensor strip 28 therefore functions as a variable resistor whose resistance varies predictably with the level of erosion of product materials. Conductors 30 provide electrical access from sensor strip 28 to contact pads 32. Contact pads 32 provide the staging area from which sensor strip 28 can be electrically connected to resistance measuring devices 44 of FIG. 2. FIG. 1B also illustrates the physical condition of sensor 20 after a lapping procedure has been utilized to expose one surface of sensor strip 28. Lapped sensor edge 22, forms the outer surface of sensor 20 from which the surface of sensor strip 28 is exposed. Lapped sensor edge 22 is the surface on which the etching process will begin and represents the outer edge of sensor 20 at the time of calibration. Although the depicted embodiment includes a lapped sensor edge 22, it should be noted that a the present invention can be implemented without utilizing a lapping process.

During an etching cycle, material erodes uniformly from lapped sensor edge 22, forming an etch channel with a length 34 and a depth 36. Prior to etching, when etch depth 36 is zero, the resistance of sensor strip 28 is utilized to calibrate end-point detection sensor 20. The resistance value measured across sensor strip 28 before etching begins is the calibration resistance. As etching proceeds and etch depth 36 grows deeper, material is removed from sensor strip 28 and its resistance increases. The resulting difference from the calibration resistance can be tracked in real time. By measuring this differential change in resistance across sensor strip 28, the etching process can be accurately monitored.

Figure 2:
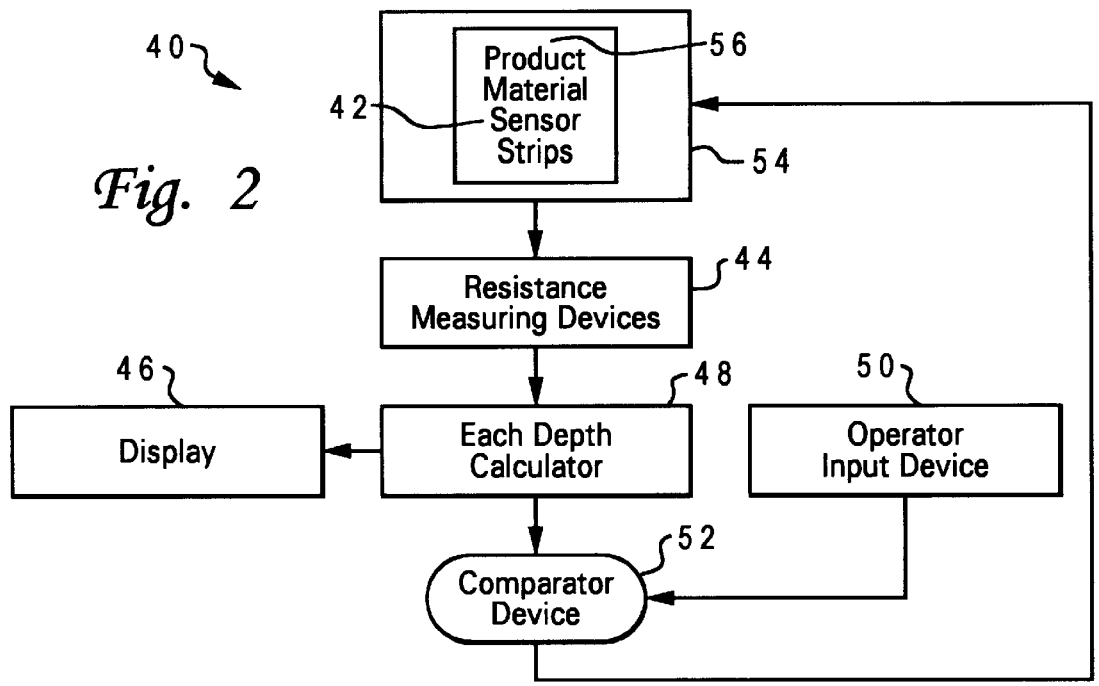
FIG. 2 is a high-level block diagram depicting the functional devices utilized in a preferred embodiment of the end-point detection method.

FIG. 2 depicts a representative block diagram in accordance with a preferred embodiment of the present invention. End-point detection system 40 includes an etching tool 54, one or more sensor strips 42, one or more resistance measuring devices 44, an etch depth calculator 48, a display 46, an operator input device 50 and a comparator device 52.

Etching tool 54 etches sensor strips 42 which erode at a rate predictable with the rate of erosion of product material 56. Sensor strips 42 are electrically coupled to resistance measuring devices 44, which are digital ohmmeters in a preferred embodiment of end point detection system 40. Resistance measuring devices 44 measure the resistance values of sensor strips 42 before and during etching cycles. The resistance values measured just prior to commencement of etching, are the zero-depth references used to calibrate an etch depth calculator 48 which is electrically coupled to receive resistance information from resistance measuring devices 44.

During an etching cycle, the resistance values measured by resistance measuring devices 44 begin to diverge from the zero-depth references. These differential changes in resistance are converted to a corresponding actual etch depth value by etch depth calculator 48. Actual etch depth information is transmitted from etch depth calculator 48 to display 46 which provides a visual indication to the operator of etching tool 54 of the progress of the etching process. In one preferred embodiment of end-point detection system 40, display 46 is a numerical display.

Actual etch depth information is also electrically transmitted from etch depth calculator 48 to comparator device 52. Comparator device 52 compares the actual etch depth with a target etch depth value received from operator input device 50 which is also electrically coupled to comparator device 52. In a preferred embodiment of the present invention, a cycle-termination signal is transmitted from comparator device 52 to etching tool 54 at the point in time at which actual etch depth is the same as the target depth thereby providing automated end-point control of the etching process.

Figure 3:
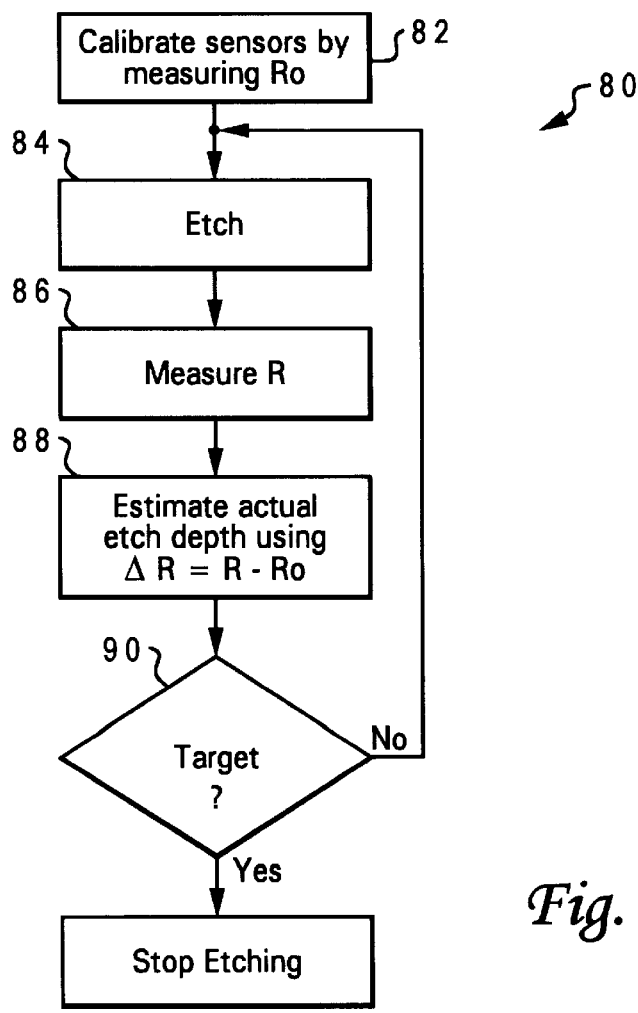
FIG. 3 is a flow diagram depicting the series of operations utilized in a preferred embodiment of the end-point detection method.

Refer now to FIG. 3 for an understanding of the operation of end-point detection system 40 depicted in FIG. 2. End-point detection method 80 is a flow diagram illustrating the sequence of steps entailed in calibration and operation of the end-point detection system 40. Initially in step 82, the sensors are calibrated after end-point detection sensors have been lapped but before the etching process has begun. Step 84 marks the start of the etching process which continues uninterrupted until step 90 terminates with a "yes" result. At step 86, the resistance value R represents the individual or average resistance values of sensor strips 42 in FIG. 2, at any given time during the etching process. At step 88, the increasing resistance differential between R and the calibration resistance of sensor strips 42 in FIG. 2 is utilized to estimate actual etch depth. It is noted that steps 84 through 90, occur essentially simultaneously in the indicated sequence.

Figure 4:
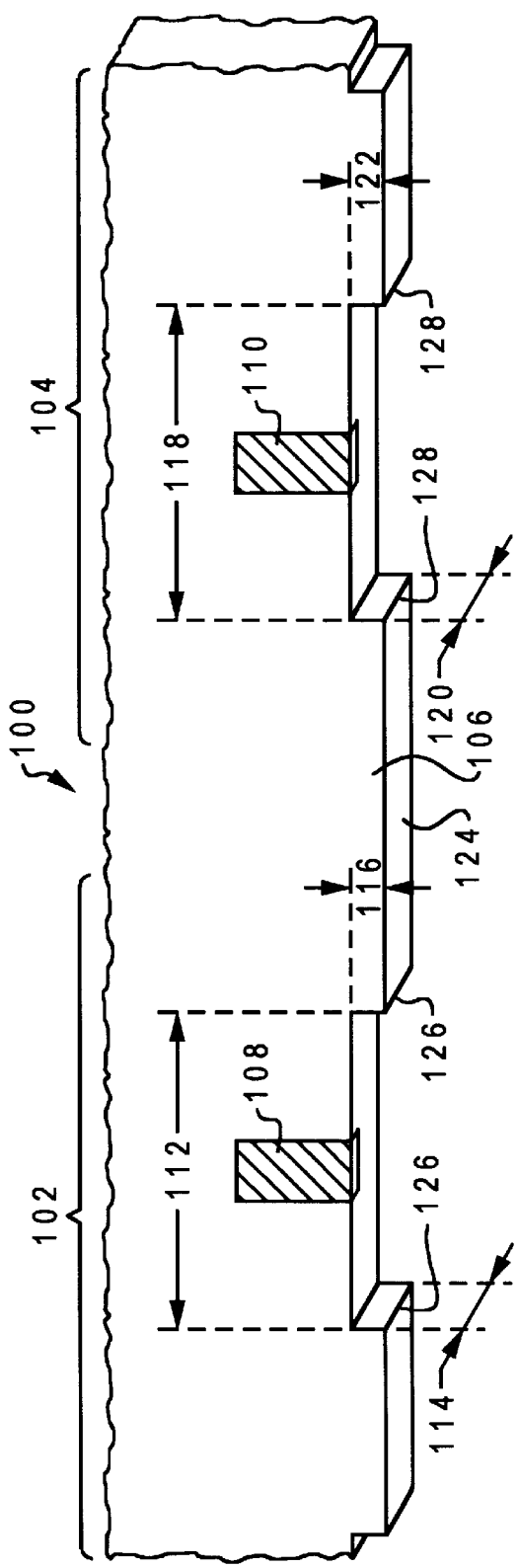
FIG. 4 illustrates an isometric view of a section of a sensor row containing two sensors in accordance with a preferred embodiment of the present invention.

FIG. 4 depicts a preferred embodiment of the present invention in which sensors 102 and 104 form a section of sensor row 100. The overall geometric dimensions of sensor row 100 are similar to those of the product rows (not depicted) which are etched alongside sensor row 100. Prior to being placed in the etching device (not depicted), sensor row 100 is lapped in order to expose bottom surface 124. The lap machine, (not depicted), is comprised of a rotating circular plate with a flat, horizontal abrasive-laden surface against which bottom surface 124 is forced by both gravity and a series of weights. Bottom surface 124 is the starting point from which the etching process begins and is therefore the point at which the initial calibration resistance across sensor strips 108 and 110 is ascertained.

Sensors 102 and 104 are each comprised of a substrate 106 onto which sensor strips 108 and 110 have been deposited. Etch pockets 126 and 128 are formed as material is eroded from locations on substrate 106 on which sensor strips 108 and 110 reside. Resistance measuring devices, depicted as block 44 in FIG. 2, are electrically connected to sensor strips 108 and 110 and measure the changing resistance values as etch pockets 126 and 128 grow deeper. Reactive ion etching is a preferred etching method to be utilized with the present invention.

The dimensions of etch pockets 126 and 128 include lengths 114 and 120, widths, 112 and 118, and etch depths 116 and 122. lengths 114 and 120, are determined by the geometry of sensor row 100 and remain constant throughout the etching process. The widths, 112 and 118, are determined by a photoresist pattern (not shown) that is utilized to select which portions of bottom surface 124 will be etched. The resistance of each of sensor strips 108 and 110 varies as a predictable hyperbolic function of the increase in etch depths 116 and 122.

Figure 5:
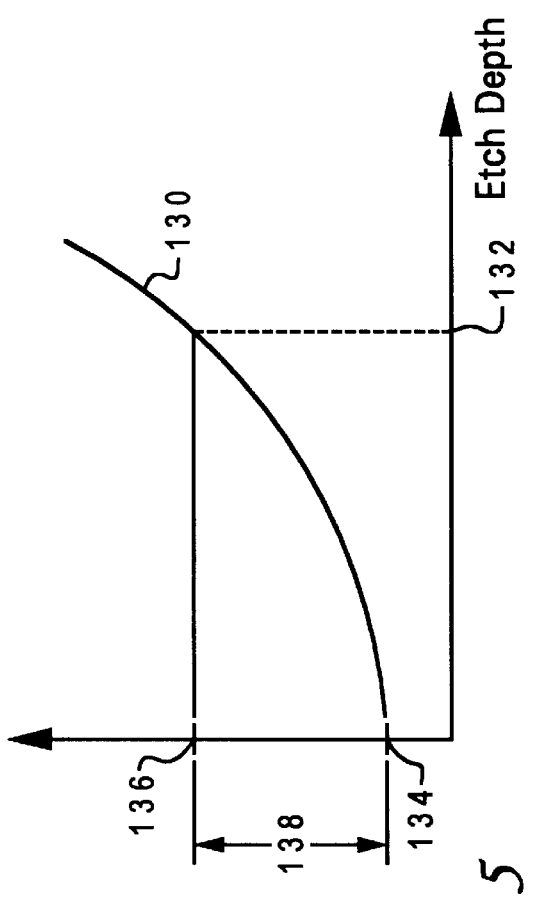
FIG. 5 is a graph depicting the correlation between the resistance of the sensor strips and the depth of the etch pockets depicted in FIG. 4.

FIG. 5 is a graph illustrating the changing resistance value measured across either of sensor strips 108 or 110 in FIG. 4 as a function of the progress of etch depths 116 and 122. Function 130 depicts the hyperbolic variation of the resistances measured by resistance measuring devices (depicted as block 44 of FIG. 2) as material is etched from a sensor strip such as either of sensor strips 108 or 110. A calibration resistance 134 is the measured value of resistance just prior to commencement of the etching process. The resistance value marked 136 designates the value of resistance at which the desired resistance differential 138, corresponding to a desired etch depth, has been achieved. The target etch depth 132, corresponds to resistance 136 and marks the point at which the etching cycle should be terminated.

While the invention has been particularly shown as described with reference to a preferred embodiment, it will be understood by those skilled in the art that various changes in form and detail may be made therein without departing from the spirit and scope of the invention. It is therefore contemplated that such modifications can be made without departing from the spirit or scope of the present invention as defined in the appended claims.

What is claimed is:

1. A system for monitoring etch depth during an etching cycle comprising:

means for depositing at least one sensor strip onto a substrate;

a dry etching device for etching said sensor strip;

means for measuring resistance of said sensor strip; and means for precisely controlling said dry etching device utilizing said measured resistance.

2. The system of claim 1 wherein said dry etching device is a reactive ion etching device.

3. The system of claim 1 further comprising:

means for displaying said resistance.

4. The system of claim 1 further comprising:

means for converting said resistance to an etch depth; and means for displaying said etch depth.

5. The system of claim 4 further comprising:

means for comparing said etch depth with a target etch depth during an etching cycle;

means for discerning a point in time during said etching cycle at which said etch depth is the same as said target etch depth; and means for halting operation of said dry-etching device at said point in time at which said etch depth is equal to said target etch depth.

* * * * *